US008858823B2

(12) United States Patent
Rached et al.

(10) Patent No.: US 8,858,823 B2
(45) Date of Patent: Oct. 14, 2014

(54) COMPOSITIONS COMPRISING 3,3,3-TRIFLUOROPROPENE AND AMMONIA

(75) Inventors: Wissam Rached, Chaponost (FR); Jean-Christophe Boutier, Oullins (FR)

(73) Assignee: Arkema France, Colombes (FR)

( * ) Notice: Subject to any disclaimer, the term of this patent is extended or adjusted under 35 U.S.C. 154(b) by 0 days.

(21) Appl. No.: 14/007,802

(22) PCT Filed: Mar. 9, 2012

(86) PCT No.: PCT/FR2012/050499

§ 371 (c)(1), (2), (4) Date: Sep. 26, 2013

(87) PCT Pub. No.: WO2012/136911

PCT Pub. Date: Oct. 11, 2012

(65) Prior Publication Data

US 2014/0024575 A1 Jan. 23, 2014

(30) Foreign Application Priority Data

Apr. 8, 2011 (FR) ..................................... 11 53071

(51) Int. Cl.

| | |
|---|---|
| ***C09K 5/10*** | (2006.01) |
| ***C11D 7/28*** | (2006.01) |
| ***C11D 7/50*** | (2006.01) |
| ***C08J 9/12*** | (2006.01) |
| ***C11D 7/06*** | (2006.01) |
| ***C08J 9/14*** | (2006.01) |
| ***C09K 3/00*** | (2006.01) |
| ***C11D 3/43*** | (2006.01) |
| ***F25B 13/00*** | (2006.01) |
| ***C09K 5/04*** | (2006.01) |
| ***C09K 3/30*** | (2006.01) |

(52) U.S. Cl.

CPC ................ *C09K 5/045* (2013.01); *C08J 9/127* (2013.01); *C11D 7/06* (2013.01); *C11D 7/5018* (2013.01); *C09K 2205/132* (2013.01); *C08J 9/146* (2013.01); *C09K 2205/126* (2013.01); *C08J 2203/184* (2013.01); *C09K 3/00* (2013.01); *C11D 3/43* (2013.01); *F25B 13/00* (2013.01); *C09K 2205/32* (2013.01); *C08J 2203/162* (2013.01); *C09K 3/30* (2013.01)

USPC .............. 252/67; 510/412; 510/415; 510/435

(58) Field of Classification Search

USPC ............................ 252/67; 510/412, 415, 435

See application file for complete search history.

(56) References Cited

U.S. PATENT DOCUMENTS 4,755,316 A 7/1988 Magid et al.
4,971,712 A 11/1990 Gorski et al.

(Continued)

FOREIGN PATENT DOCUMENTS

WO WO 2007/126414 * 11/2007 .............. C09K 3/30
WO WO 2007/126414 A2 11/2007
WO WO 2008/033570 A2 3/2008

OTHER PUBLICATIONS

Montzka et al., “Controlled Substances and Other Source Gases”, Chapter 1 of the Scientific Assessment of Ozone Depletion, World Meteorological Organization Global Ozone Research and Monitoring Project-Report No. 47, 2002, 109 Pages.

(Continued)

*Primary Examiner* — Brian P Mruk

(74) *Attorney, Agent, or Firm* — Buchanan Ingersoll & Rooney P.C.

(57) ABSTRACT

A composition based on 3,3,3-trifluoropropene and ammonia, and to the use thereof, especially as a heat transfer fluid. A heat-transfer composition including the composition based on 3,3,3-trifluoropropene and ammonia and also one or more additives chosen from lubricants, stabilizers, surfactants, tracers, fluorescers, odorant agents and solubilizers, and mixtures thereof. A process for heating or cooling a fluid or a body by means of a vapor compression circuit containing a heat-transfer fluid, said process successively including evaporation of the heat-transfer fluid, compression of the heat-transfer fluid, condensation of the heat fluid and depressurization of the heat-transfer fluid, in which the heat-transfer fluid is a composition based on 3,3,3-trifluoropropene and ammonia.

21 Claims, 1 Drawing Sheet

10
8
6
4
2
0
0
1

(56) References Cited

U.S. PATENT DOCUMENTS

| | | | |
|---|---|---|---|
| 4,975,212 | A | 12/1990 | Thomas et al. |
| 5,008,028 | A | 4/1991 | Jolley et al. |
| 2008/0069177 | A1 | 3/2008 | Minor et al. |

OTHER PUBLICATIONS

International Search Report (PCT/ISA/210) mailed on Jul. 9, 2012, by the French Patent Office as the International Searching Authority for International Application No. PCT/FR2012/050499.

* cited by examiner

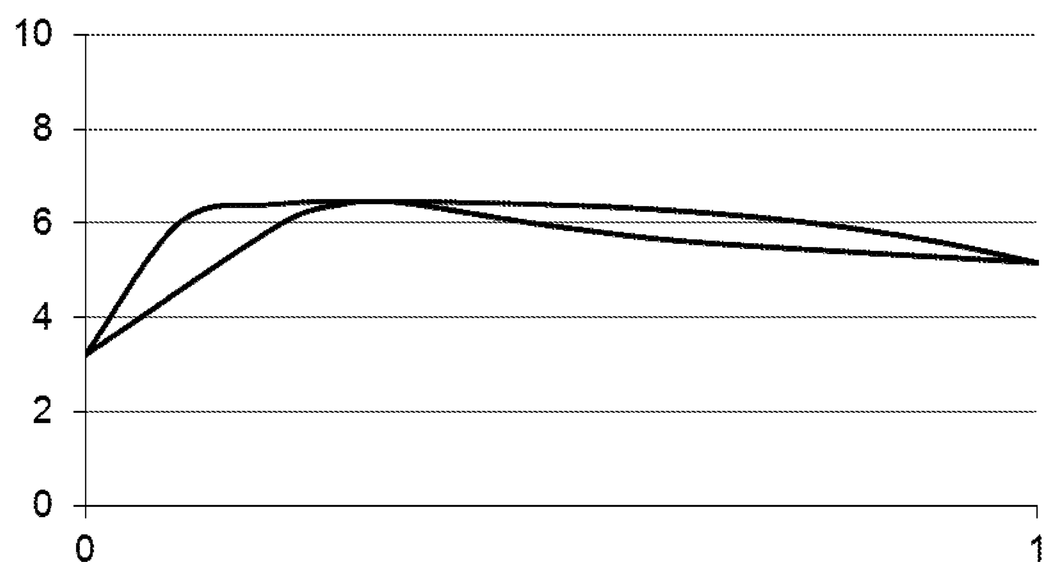
10
8
6
4
2
0
0
1

COMPOSITIONS COMPRISING 3,3,3-TRIFLUOROPROPENE AND AMMONIA

FIELD OF THE INVENTION

The present invention relates to compositions comprising 3,3,3-trifluoropropene and to the use thereof, especially as heat-transfer fluids.

TECHNICAL BACKGROUND

Fluids based on fluorocarbon compounds are widely used in vapor-compression heat-transfer systems, especially air-conditioning, heat-pump, refrigeration or freezing devices. The common feature of these devices is that they are based on a thermodynamic cycle comprising vaporization of the fluid at low pressure (in which the fluid absorbs heat); compression of the vaporized fluid up to a high pressure; condensation of the vaporized fluid to liquid at high pressure (in which the fluid expels heat); and depressurization of the fluid to complete the cycle.

The choice of a heat-transfer fluid (which may be a pure compound or a mixture of compounds) is dictated firstly by the thermodynamic properties of the fluid, and secondly by additional constraints. Thus, a particularly important criterion is that of the environmental impact of the fluid under consideration. In particular, chlorinated compounds (chlorofluorocarbons and hydrochlorofluorocarbons) have the drawback of damaging the ozone layer. Non-chlorinated compounds are therefore now generally preferred, such as hydrofluorocarbons, fluoro ethers and fluoro olefins.

It is, however, necessary to develop other heat-transfer fluids which have a global warming potential (GWP) less than that of the heat-transfer fluids currently used, and which have equivalent or improved performance qualities.

The use of ammonia as a heat-transfer fluid is known. However, a certain number of problems are associated with this compound: a very high compressor outlet temperature relative to hydrofluorocarbons; an absence of oil return and the obligation to install an oil separator; a total permitted charge that is occasionally limited on account of the toxicity of the product.

Document US 2008/0 069 177 describes a large number of mixtures of heat-transfer compounds, and especially mixtures comprising 3,3,3-trifluoropropene (HFO-1243zf) and also other mixtures comprising ammonia. The latter mixtures are, more precisely: a 1,2,3,3,3-pentafluoropropene (HFO-1225ye)/ammonia binary composition; two difluoromethane (HFC-32)/ammonia/HFO-1225ye and HFO-1225ye/pentafluoroethane (HFC-125)/ammonia ternary compositions; and three HFC-32/ammonia/HFO-1225ye/$CF_3$1, HFC-32/ammonia/2,3,3,3-tetrafluoropropene (HFO-1234yf)/$CF_3I$ and HFC-1225ye/HFC-32/HFC-125/ammonia quaternary compositions.

Document WO 2008/033 570 contains teaching similar to that of document US 2008/0 069 177.

However, there is still a need to develop other heat-transfer fluids which have a relatively low GWP, and which are capable of replacing the usual heat-transfer fluids.

In particular, it is desirable to develop other low-GWP heat-transfer fluids which are quasi-azeotropic or even azeotropic and/or which have good energy performance qualities relative to the usual heat-transfer fluids (such as R404A or R410A).

SUMMARY OF THE INVENTION

The invention relates firstly to a composition comprising 3,3,3-trifluoropropene and ammonia.

According to one embodiment, 3,3,3-trifluoropropene and ammonia represent at least 95%, preferably at least 99% and more particularly preferably at least 99.9% of the composition.

According to one embodiment, the composition comprises:

from 10% to 70% of ammonia and from 30% to 90% of 3,3,3-trifluoropropene;

preferably from 20% to 50% of ammonia and from 50% to 80% of 3,3,3-trifluoropropene, or from 15% to 35% of ammonia and from 65% to 85% of 3,3,3-trifluoropropene;

more particularly preferably from 20% to 35% of ammonia and from 65% to 80% of 3,3,3-trifluoropropene; and most particularly preferably from 25% to 35% of ammonia and from 65% to 75% of 3,3,3-trifluoropropene.

The invention also relates to the use of the composition according to the invention as a heat-transfer fluid.

According to one embodiment, the composition is quasi-azeotropic and preferably is azeotropic.

The invention also relates to a heat-transfer composition comprising the composition according to the invention and also one or more additives chosen from lubricants, stabilizers, surfactants, tracers, fluorescers, odorant agents and solubilizers, and mixtures thereof.

The invention also relates to a heat-transfer installation comprising a vapor compression circuit containing a composition according to the invention as heat-transfer fluid or containing a heat-transfer composition as described above.

According to one embodiment, the installation is chosen from mobile or stationary heat-pump heating, air-conditioning, refrigeration, freezing and Rankine-cycle installations, and especially from motor vehicle air-conditioning installations.

The invention also relates to a process for heating or cooling a fluid or a body by means of a vapor compression circuit containing a heat-transfer fluid, said process successively comprising evaporation of the heat-transfer fluid, compression of the heat-transfer fluid, condensation of the heat fluid and depressurization of the heat-transfer fluid, in which the heat-transfer fluid is a composition according to the invention.

According to one embodiment, this process is a process for cooling a fluid or a body, in which the temperature of the cooled fluid or body is from −15° C. to 15° C., preferably from −10° C. to 10° C. and more particularly preferably from −5° C. to 5° C.; or is a process for heating a fluid or a body, in which the temperature of the heated fluid or body is from 30° C. to 90° C., preferably from 35° C. to 60° C. and more particularly preferably from 40° C. to 50° C.

According to one embodiment, this process is a process for cooling a fluid or a body, in which the temperature of the cooled fluid or body is from −40° C. to −10° C., preferably from −35° C. to −25° C. and more particularly preferably from −30° C. to −20° C.

According to one embodiment, this process is a process for heating a fluid or a body, in which the temperature of the heated fluid or body is greater than 90° C., preferably greater than or equal to 100° C. or greater than or equal to 110° C., and preferably less than or equal to 120° C.

The invention also relates to a process for reducing the environmental impact of a heat-transfer installation comprising a vapor compression circuit containing an initial heat-transfer fluid, said process comprising a step of replacing the initial heat-transfer fluid in the vapor compression circuit with a final heat-transfer fluid, the final transfer fluid having a lower GWP than the initial heat-transfer fluid, in which the final heat-transfer fluid is a composition according to the invention.

The invention also relates to the use of the composition according to the invention as a solvent.

The invention also relates to the use of the composition according to the invention as an expansion agent.

The invention also relates to the use of the composition according to the invention as a propellant, preferably for an aerosol.

The invention also relates to the use of the composition according to the invention as a cleaning agent.

The present invention makes it possible to satisfy the needs felt in the prior art. It more particularly provides novel low-GWP compositions which can be used (inter alia) as heat-transfer fluids, especially in replacement for the usual heat-transfer fluids.

In particular, the invention provides azeotropic or quasi-azeotropic compositions.

In certain embodiments, the invention provides heat-transfer fluids which have good energy performance relative to usual heat-transfer fluids, in particular R404A and R410A.

In certain embodiments, the compositions according to the invention especially have an improved volumetric capacity and/or an improved performance coefficient relative to the compositions of the prior art.

Finally, the invention makes it possible partially or totally to overcome the problems listed above that are traditionally associated with ammonia.

BRIEF DESCRIPTION OF THE FIGURES

FIG. 1 represents the vapor/liquid equilibrium data at 5° C. for binary mixtures of HFO-1243zf and $NH_3$, demonstrating the existence of an azeotrope and of quasi-azeotropes. The proportion of $NH_3$ between 0 and 1 (=100%) is represented on the x-axis and the pressure in bar is represented on the y-axis.

DESCRIPTION OF EMBODIMENTS OF THE INVENTION

The invention is now described in greater detail and without limitation in the description that follows.

R404A denotes a mixture of 52% 1,1,1-trifluoroethane, 44% pentafluoroethane and 4% 1,1,1,2-tetrafluoroethane; and R410A denotes a mixture of 50% difluoromethane and 50% pentafluoroethane.

Unless otherwise mentioned, throughout the application the indicated proportions of compounds are given as mass percentages.

According to the present patent application, the global warming potential (GWP) is defined relative to carbon dioxide and relative to a duration of 100 years, according to the method indicated in "*The scientific assessment of ozone depletion,* 2002, *a report of the World Meteorological Association's Global Ozone Research and Monitoring Project*".

The term "heat-transfer compound" or, respectively, "heat-transfer fluid" (or coolant fluid) means a compound or, respectively, a fluid that is capable of absorbing heat by evaporating at low temperature and low pressure and of expelling heat by condensing at high temperature and high pressure, in a vapor compression circuit. In general, a heat-transfer fluid may comprise one, two, three or more than three heat-transfer compounds.

The term "heat-transfer composition" means a composition comprising a heat-transfer fluid and optionally one or more additives that are not heat-transfer compounds for the intended application.

The additives may be chosen especially from lubricants, stabilizers, surfactants, tracers, fluorescers, odorant agents and solubilizers.

Preferably, the composition comprises a heat-transfer fluid and at least one lubricant.

Lubricants that may especially be used include oils of mineral origin, silicone oils, paraffins of natural origin, naphthenes, synthetic paraffins, alkylbenzenes, poly-α-olefins, polyalkylene glycols, fluorinated and/or chlorinated oils such as aromatic fluoro compounds containing 1 to 4 aromatic groups, perfluorocarbons or perfluoro polyethers, polyol esters and/or polyvinyl ethers.

Polyalkylene glycols are preferred.

In general, the polyalkylene glycol that is suitable for use in the context of the invention comprises from 5 to 50 repeated oxyalkylene units, each containing from 1 to 5 carbon atoms.

The polyalkylene glycol may be linear or branched. It may be a homopolymer or a copolymer of 2, 3 or more than 3 groups chosen from oxyethylene, oxypropylene, oxybutylene and oxypentylene groups and combinations thereof.

Preferred polyalkylene glycols comprise at least 50% of oxypropylene groups.

Suitable polyalkylene glycols are described in document U.S. Pat. No. 4,971,712. Other suitable polyalkylene glycols are polyalkylene glycols containing hydroxyl groups at each end, as described in document U.S. Pat. No. 4,755,316. Other suitable polyalkylene glycols are polyalkylene glycols containing a capped hydroxyl end. The hydroxyl group may be capped with an alkyl group containing from 1 to 10 carbon atoms (and optionally containing one or more heteroatoms such as nitrogen), or a fluoroalkyl group containing heteroatoms such as nitrogen, or a fluoroalkyl group as described in document U.S. Pat. No. 4,975,212, or other similar groups.

When the two hydroxyl ends of the polyalkylene glycol are capped, the same end group or a combination of two different groups may be used.

The end hydroxyl groups may also be capped by forming an ester with a carboxylic acid, as is described in document U.S. Pat. No. 5,008,028. The carboxylic acid may also be fluorinated.

When the two ends of the polyalkylene glycol are capped, one or the other may be capped with an ester, or alternatively one end may be capped with an ester and the other end may be free or may be capped with one of the abovementioned alkyl, heteroalkyl or fluoroalkyl groups.

Polyalkylene glycols that may be used as lubricant oils and that are commercially available are, for example, the oils Goodwrench from General Motors, MOPAR-56 from Daimler-Chrysler, Zerol from Shrieve Chemical Products, Planetelf PAG from Total and Daphne Hermetic PAG from Itemitsu. Other suitable polyalkylene glycols are manufactured by Dow Chemical and Denso. Mention may also be made of the oils manufactured by Fuchs and especially the oil RENISO PG 68/$NH_3$.

Fluorinated and/or chlorinated oils that may be used as lubricants oils and that are commercially available are, for example, perfluorocarbons or perfluoropolyethers, especially Krytox from Dupont, Fomblin from Solvay Solexis, Demnum from Daikin and trifluorochloroethylene oligomers.

The viscosity of the polyalkylene glycol may be, for example, from 1 to 1000 centistokes at 40° C., preferably from 10 to 200 centistokes at 40° C. and more particularly preferably from 30 to 80 centistokes at 40° C.

The viscosity is determined according to the ISO viscosity grades, in accordance with standard ASTM D2422.

The oil sold by Denso under the name NDB, with a viscosity of 46 centistokes, is particularly suitable.

The stabilizer(s), when they are present, preferably represent not more than 5% by mass in the heat-transfer composition. Among the stabilizers, mention may be made especially of nitromethane, ascorbic acid, terephthalic acid, azoles such as tolutriazole or benzotriazole, phenolic compounds such as tocopherol, hydroquinone, t-butylhydroquinone, 2,6-di-tert-butyl-4-methylphenol, epoxides (optionally fluorinated or perfluorinated alkyl, or alkenyl or aromatic) such as n-butyl glycidyl ether, hexanediol diglycidyl ether, allyl glycidyl ether or butylphenyl glycidyl ether, phosphites, phosphonates, thiols and lactones.

As tracers (which can be detected), mention may be made of deuterated or non-deuterated hydrofluorocarbons, deuterated hydrocarbons, perfluorocarbons, fluoro ethers, bromo compounds, iodo compounds, alcohols, aldehydes, ketones, nitrous oxide and combinations thereof. The tracer is different from the heat-transfer compound(s) of which the heat-transfer fluid is composed.

Examples of solubilizers that may be mentioned include hydrocarbons, dimethyl ether, polyoxyalkylene ethers, amides, ketones, nitriles, chlorocarbons, esters, lactones, aryl ethers, fluoro ethers and 1,1,1-trifluoroalkanes. The solubilizer is different from the heat-transfer compound(s) of which the heat-transfer fluid is composed.

Fluorescers that may be mentioned include naphthalimides, perylenes, coumarins, anthracenes, phenanthracenes, xanthenes, thioxanthenes, naphthoxanthenes and fluoresceins, and derivatives and combinations thereof.

Odorant agents that may be mentioned include alkylacrylates, allylacrylates, acrylic acids, acrylic esters, alkyl ethers, alkyl esters, alkynes, aldehydes, thiols, thio ethers, disulfides, allylisothiocyanates, alkanoic acids, amines, norbornenes, norbornene derivatives, cyclohexene, heterocyclic aromatic compounds, ascaridole and o-methoxy(methyl)phenol, and combinations thereof.

The heat-transfer process according to the invention is based on the use of an installation comprising a vapor compression circuit which contains a heat-transfer fluid. The heat-transfer process may be a process for heating or cooling a fluid or a body.

The vapor compression circuit containing a heat-transfer fluid comprises at least one evaporator, a compressor, a condenser and a depressurizer, and also lines for transporting the heat-transfer fluid between these components. The evaporator and the condenser comprise a heat exchanger for exchanging heat between the heat-transfer fluid and another fluid or body.

As compressor, use may be made especially of a single-stage or multi-stage centrifugal compressor or a centrifugal mini-compressor. Rotary, piston or screw compressors may also be used. The compressor may be driven by an electric motor or by a gas turbine (for example fed with the exhaust gases of a vehicle, or mobile applications) or by gearing.

The installation may comprise an electricity-generating turbine (Rankine cycle).

The installation may also optionally comprise at least one heat-exchange fluid used for transmitting heat (with or without a change of state) between the heat-transfer fluid circuit and the fluid or body to be heated or cooled.

The installation may also optionally comprise two (or more) vapor compression circuits, containing identical or different heat-transfer fluids. For example, the vapor compression circuits may be coupled together.

The vapor compression circuit operates according to a standard vapor compression cycle. The cycle comprises the change of state of the heat-transfer fluid from a liquid phase (or liquid/vapor two-phase system) to a vapor phase at a relatively low pressure, followed by compression of the fluid in vapor phase up to a relatively high pressure, the change of state (condensation) of the heat-transfer fluid from the vapor phase to the liquid phase at a relatively high pressure, and reduction of the pressure to recommence the cycle.

In the case of a cooling process, heat derived from the fluid or body that is being cooled (directly or indirectly, via a heat-exchange fluid) is adsorbed by the heat-transfer fluid, during the evaporation of the latter, this taking place at a relatively low temperature relative to the environment. The cooling processes comprise air-conditioning processes (with mobile installations, for example in vehicles, or stationary installations), refrigeration and freezing processes or cryogenic processes.

In the case of a heating process, heat is yielded (directly or indirectly, via a heat-exchange fluid) from the heat-transfer fluid, during the condensation of the latter, to the fluid or body that is being heated, this taking place at a relatively high temperature relative to the environment. In this case, the installation for transferring heat is known as a “heat pump”.

It is possible to use any type of heat exchanger for the implementation of the heat-transfer fluids according to the invention, and especially co-current heat exchangers or, preferably, counter-current heat exchangers.

The heat-transfer fluids used in the context of the present invention are compositions comprising HFO-1243zf and $NH_3$.

The heat-transfer fluids according to the invention may comprise one or more additional heat-transfer compounds, besides HFO-1243zf and $NH_3$. These additional heat-transfer compounds may be chosen especially from hydrocarbons, hydrofluorocarbons, ethers, hydrofluoro ethers and fluoro olefins.

According to particular embodiments, the heat-transfer fluids according to the invention may be ternary compositions (consisting of three heat-transfer compounds) or quaternary compositions (consisting of four heat-transfer compounds).

However, binary heat-transfer fluids, i.e. fluids consisting of a mixture of HFO-1243zf and $NH_3$, are preferred.

The term “binary composition” means either a composition consisting of HFO-1243zf and $NH_3$; or a composition consisting essentially of HFO-1243zf and $NH_3$, but which may contain impurities to a proportion of less than 1%, preferably less than 0.5%, preferably less than 0.1%, preferably less than 0.05% and preferably less than 0.01%.

According to particular embodiments, the proportion of HFO-1243zf in the heat-transfer fluid may be: from 0.1% to 5%; or from 5% to 10%; or from 10% to 15%; or from 15% to 20%; or from 20% to 25%; or from 25% to 30%; or from 30% to 35%; or from 35% to 40%; or from 40% to 45%; or from 45% to 50%; or from 50% to 55%; or from 55% to 60%; or from 60% to 65%; or from 65% to 70%; or from 70% to 75%; or from 75% to 80%; or from 80% to 85%; or from 85% to 90%; or from 90% to 95%; or from 95% to 99.9%.

According to particular embodiments, the proportion of $NH_3$ in the heat-transfer fluid may be: 0.1% to 5%; or from 5% to 10%; or from 10% to 15%; or from 15% to 20%; or from 20% to 25%; or from 25% to 30%; or from 30% to 35%; or from 35% to 40%; or from 40% to 45%; or from 45% to 50%; or from 50% to 55%; or from 55% to 60%; or from 60% to 65%; or from 65% to 70%; or from 70% to 75%; or from 75% to 80%; or from 80% to 85%; or from 85% to 90%; or from 90% to 95%; or from 95% to 99.9%.

It may be preferable not to have too high a proportion of $NH_3$ in the mixture, in the context of a use as a heat-transfer fluid, in order to avoid an excessively high temperature increase at the compressor outlet.

Among the above compositions, some have the advantage of being azeotropic or quasi-azeotropic. For example, the azeotrope for the HFO-1243zf/$NH_3$ binary mixture is obtained for a proportion of $NH_3$ of about 30%, at a temperature of 5° C. and at a pressure of about 6.4 bar.

The term "quasi-azeotropic" denotes compositions for which, at constant temperature, the liquid saturation pressure and the vapor saturation pressure are virtually identical (the maximum pressure difference being less than 10%, or even advantageously 5%, relative to the liquid saturation pressure).

For "azeotropic" compositions, at constant temperature, the maximum pressure difference is in the region of 0%.

These heat-transfer fluids have the advantage of being easy to use. In the absence of a significant temperature glide, there is no significant change in the circulating composition, and similarly no significant change in the composition in the event of a leak.

In addition, it has been found that certain compositions according to the invention have improved performance relative to R404A and/or R410A, in particular for cooling processes at moderate temperature, i.e. those in which the temperature of the cooled fluid or body is from −15° C. to 15° C., preferably from −10° C. to 10° C. and more particularly preferably from −5° C. to 5° C. (ideally about 0° C.). In this regard, the compositions for which the proportion of $NH_3$ is from 10% to 70% are particularly preferred, especially compositions with a proportion of $NH_3$ of from 20% to 50% and preferably from 20% to 35%.

It has also been found that certain compositions according to the invention have improved performance relative to R410A, in particular for heating processes at moderate temperature, i.e. those in which the temperature of the heated fluid or body is from 30° C. to 80° C., preferably from 35° C. to 55° C. and more particularly preferably from 40° C. to 50° C. (ideally about 45° C.). In this regard, the compositions for which the proportion of $NH_3$ is from 15% to 70% are particularly preferred, especially compositions with a proportion of $NH_3$ of from 20% to 35%.

The Applicant has noted that the composition comprising HFO-1243zf and $NH_3$ shows better miscibility with oils than ammonia or HFO-1243zf alone.

In the processes of "cooling or heating at moderate temperature" mentioned above, the inlet temperature of the heat-transfer fluid into the evaporator is preferably from −20° C. to 10° C., especially from −15° C. to 5° C., more particularly preferably from −10° C. to 0° C., for example about −5° C.; and the condensation start temperature of the heat-transfer fluid in the condenser is preferably from 25° C. to 90° C., especially from 30° C. to 70° C., more particularly preferably from 35° C. to 55° C., for example about 50° C. These processes may be refrigeration, air-conditioning or heating processes.

Certain compositions are also suitable for high-temperature heating processes, i.e. those in which the temperature of the heated fluid or body is greater than 90° C., for example greater than or equal to 100° C. or greater than or equal to 110° C., and preferably less than or equal to 120° C.

It has also been found that certain compositions according to the invention have improved performance relative to R404A, in particular for low-temperature refrigeration processes, i.e. those in which the temperature of the cooled fluid or body is from −40° C. to −10° C., preferably from −35° C. to −25° C. and more particularly preferably from −30° C. to −20° C. (ideally about −25° C.). In this regard, the compositions for which the proportion of $NH_3$ is from 15% to 35% are particularly preferred.

In the "low-temperature refrigeration" processes mentioned above, the inlet temperature of the heat-transfer fluid into the evaporator is preferably from −45° C. to −15° C., especially from −40° C. to −20° C. and more particularly preferably from −35° C. to −25° C., for example about −30° C.; and the condensation start temperature of the heat-transfer fluid in the condenser is preferably from 25° C. to 80° C., especially from 30° C. to 60° C. and more particularly preferably from 35° C. to 55° C., for example about 40° C.

More generally, the compositions according to the invention may serve to replace any heat-transfer fluid in all heat transfer applications, for example in motor vehicle air conditioning. For example, the compositions according to the invention may serve to replace:

- 1,1,1,2-tetrafluoroethane (R134a);
- 1,1-difluoroethane (R152a);
- 1,1,1,3,3-pentafluoropropane (R245fa);
- mixtures of pentafluoroethane (R125), 1,1,1,2-tetrafluoroethane (R134a) and isobutane (R600a), namely R422;
- chlorodifluoromethane (R22);
- the mixture of 51.2% chloropentafluoroethane (R115) and 48.8% chlorodifluoromethane (R22), namely R502;
- any hydrocarbon;
- the mixture of 20% difluoromethane (R32), 40% pentafluoroethane (R125) and 40% 1,1,1,2-tetrafluoroethane (R134a), namely R407A;
- the mixture of 23% difluoromethane (R32), 25% pentafluoroethane (R125) and 52% 1,1,1,2-tetrafluoroethane (R134a), namely R407c;
- the mixture of 30% difluoromethane (R32), 30% pentafluoroethane (R125) and 40% 1,1,1,2-tetrafluoroethane (R134a), namely R407F;
- R1234yf (2,3,3,3-tetrafluoropropene);
- R1234ze (1,3,3,3-tetrafluoropropene).

The compositions according to the invention may also be useful as expanders, propellants (for example for an aerosol), cleaning agents or solvents, besides their use as heat-transfer fluids.

As propellants, the compositions according to the invention may be used alone or in combination with other known propellants. The propellant comprises, and preferably consists of, a composition according to the invention. The active substance that is to be sprayed may be mixed with the propellant and inert compounds, solvents or other additives, to form a composition to be sprayed. Preferably, the composition to be sprayed is an aerosol.

As expanders, the compositions according to the invention may be included in an expander composition, which preferably comprises one or more other compounds capable of reacting and of forming a foam or cellular structure under suitable conditions, as is known to those skilled in the art.

In particular, the invention proposes a process for preparing an expanded thermoplastic product comprising, first, the preparation of a polymeric expansion composition. Typically, the polymeric expansion composition is prepared by plasticizing a polymer resin and by mixing the compounds of an expansion agent composition at an initial pressure. Plasticization of the polymer resin may be performed under the effect of heat, by heating the polymer resin to soften it sufficiently to mix an expansion composition. Generally, the plasticization temperature is close to the glass transition temperature or the melting point for crystalline polymers.

Other uses of the compositions according to the invention include uses as solvents, cleaning agents or the like. Examples that may be mentioned include steam degreasing, precision cleaning, the cleaning of electronic circuits, dry cleaning, abrasive cleaning, solvents for the deposition of lubricants and release agents, and other solvent or surface treatments.

EXAMPLES

The examples that follow illustrate the invention without limiting it.

Example 1

Azeotropic or Quasi-Azeotropic Compositions

A cell under vacuum equipped with a sapphire tube is cooled to 5° C. in an oil bath. Once the thermal equilibrium has been reached, the cell is charged with HFO-1243zf, and the pressure at which equilibrium is reached is recorded. An amount of $NH_3$ is introduced into the cell, and the contents are mixed in order to accelerate the equilibration. At equilibrium, a minimum amount of sample is taken from the gaseous phase and from the liquid phase for analysis by gas chromatography with a thermal detector.

The equilibrium data obtained with different compositions of HFO-1243zf and of $NH_3$ are represented in FIG. 1.

Example 2

Performance Study

The RK-Soave equation is used for calculating the densities, enthalpies and entropies and the liquid/vapor equilibrium data for the mixtures. The use of this equation requires knowledge of the properties of the pure substances used in the mixtures under consideration and also the coefficients of interaction for each binary system.

The available data for each pure substance are the boiling point, the critical temperature and the critical pressure, the pressure curve as a function of the temperature from the boiling point to the critical point, and the saturated liquid density and saturated vapor density as a function of the temperature.

The data regarding ammonia are published in the ASHRAE Handbook 2005, chapter 20, and are also available under Refrop (software developed by NIST for calculating the properties of coolant fluids).

The data of the temperature-pressure curve for HFO-1243zf are measured via the static method. The critical temperature and critical pressure are measured using a C80 calorimeter sold by Setaram.

The RK-Soave equation uses binary interaction coefficients to represent the behavior of the products as mixtures. The coefficients are calculated as a function of the liquid-vapor equilibrium experimental data.

The coefficient of performance (COP) is defined as being the useful power provided by the system over the power provided or consumed by the system.

In the tables that follow, T denotes the temperature, P denotes the pressure, % CAP denotes the volumetric capacity of the fluid relative to the reference fluid indicated on the first line, % COP denotes the coefficient of performance relative to the reference fluid indicated on the first line, and glide denotes the temperature variation in the course of the evaporator at constant pressure.

To evaluate the energy performance of the heat pump, a compression system equipped with an evaporator, condenser and internal exchanger, a screw compressor and a depressurizer is considered.

The system functions with 5° C. of overheating. The evaporation temperature is −5° C. and the condensation temperature is 50° C.

The results obtained are collated in Table 1 below.

TABLE 1 heating at moderate temperature, energy performance

| % | | T evaporator inlet (° C.) | T compressor outlet (° C.) | T condenser outlet (° C.) | T depressurizer inlet (° C.) | P evaporator (bar) | P condenser (bar) | Degree of compression (p/p) | Glide (evaporator) | Compressor yield | % CAP | % COP |
|---|---|---|---|---|---|---|---|---|---|---|---|---|
| R410A | | −5 | 92 | 50 | 48 | 6.8 | 30.7 | 4.5 | 0.07 | 78.6 | 100 | 100 |
| HFO-1243zf | $NH_3$ | | | | | | | | | | | |
| 85 | 15 | −9 | 91 | 45 | 42 | 3.8 | 19.7 | 5.2 | 3.65 | 77.0 | 71 | 112 |
| 80 | 20 | −7 | 98 | 47 | 45 | 4.2 | 21.6 | 5.2 | 1.79 | 77.1 | 78 | 112 |
| 75 | 25 | −5 | 105 | 49 | 47 | 4.5 | 22.9 | 5.2 | 0.44 | 77.1 | 84 | 112 |
| 70 | 30 | −5 | 111 | 50 | 48 | 4.5 | 23.7 | 5.2 | 0.01 | 76.9 | 87 | 112 |
| 65 | 35 | −6 | 119 | 50 | 48 | 4.4 | 23.9 | 5.4 | 0.51 | 76.5 | 88 | 111 |
| 60 | 40 | −6 | 127 | 50 | 48 | 4.3 | 23.8 | 5.5 | 1.21 | 76.2 | 87 | 110 |
| 55 | 45 | −7 | 133 | 49 | 47 | 4.2 | 23.4 | 5.6 | 1.79 | 76.0 | 87 | 110 |
| 50 | 50 | −7 | 138 | 49 | 47 | 4.1 | 23.0 | 5.6 | 2.20 | 75.9 | 86 | 111 |
| 40 | 60 | −8 | 147 | 48 | 46 | 3.9 | 22.2 | 5.7 | 2.51 | 75.7 | 85 | 112 |
| 30 | 70 | −7 | 155 | 48 | 46 | 3.8 | 21.6 | 5.7 | 2.26 | 75.7 | 84 | 113 |

For the evaluation of the energy performance for refrigeration at moderate temperature, a compression system equipped with an evaporator, condenser and internal exchanger, a screw compressor and a depressurizer is considered.

The system functions with 5° C. of overheating. The evaporation temperature is −5° C. and the condensation temperature is 50° C.

The results obtained are collated in Table 2 below.

TABLE 2 refrigeration at moderate temperature, energy performance

| % | | T evaporator inlet (° C.) | T compressor outlet (° C.) | T depressurizer inlet (° C.) | T depressurizer inlet (° C.) | P evaporator (bar) | P condenser (bar) | Degree of compression (p/p) |
|---|---|---|---|---|---|---|---|---|
| R404A | | −5 | 92 | 50 | 48 | 6.8 | 30.7 | 4.5 |
| R410A | | −5 | 69 | 50 | 48 | 5.1 | 23.0 | 4.5 |
| HFO-1243zf | $NH_3$ | | | | | | | |
| 90 | 10 | −10 | 83 | 42 | 39 | 3.3 | 17.2 | 5.2 |
| 85 | 15 | −9 | 91 | 45 | 42 | 3.8 | 19.7 | 5.2 |
| 80 | 20 | −7 | 98 | 47 | 45 | 4.2 | 21.6 | 5.2 |
| 75 | 25 | −5 | 105 | 49 | 47 | 4.5 | 22.9 | 5.2 |
| 70 | 30 | −5 | 111 | 50 | 48 | 4.5 | 23.7 | 5.2 |
| 65 | 35 | −6 | 119 | 50 | 48 | 4.4 | 23.9 | 5.4 |
| 60 | 40 | −6 | 127 | 50 | 48 | 4.3 | 23.8 | 5.5 |
| 55 | 45 | −7 | 133 | 49 | 47 | 4.2 | 23.4 | 5.6 |
| 50 | 50 | −7 | 138 | 49 | 47 | 4.1 | 23.0 | 5.6 |
| 40 | 60 | −8 | 147 | 48 | 46 | 3.9 | 22.2 | 5.7 |
| 30 | 70 | −7 | 155 | 48 | 46 | 3.8 | 21.6 | 5.7 |

| % | | Glide (evaporator) | Compressor yield | % CAP | % COP | Liquid saturating P | Vapor saturating P | P difference (%) |
|---|---|---|---|---|---|---|---|---|
| R404A | | 0.07 | 78.6 | 100 | 100 | 6.8 | 6.8 | 0 |
| R410A | | 0.35 | 78.7 | 66 | 95 | 5.1 | 5.0 | 2 |
| HFO-1243zf | $NH_3$ | | | | | | | |
| 90 | 10 | 5.30 | 77.1 | 65 | 119 | 3.5 | 2.7 | 22 |
| 85 | 15 | 3.65 | 77.0 | 74 | 117 | 3.9 | 3.3 | 14 |
| 80 | 20 | 1.79 | 77.1 | 82 | 117 | 4.2 | 3.9 | 7 |
| 75 | 25 | 0.44 | 77.1 | 88 | 117 | 4.5 | 4.4 | 2 |
| 70 | 30 | 0.01 | 76.9 | 91 | 117 | 4.5 | 4.5 | 0 |
| 65 | 35 | 0.51 | 76.5 | 91 | 115 | 4.4 | 4.4 | 2 |
| 60 | 40 | 1.21 | 76.2 | 90 | 114 | 4.3 | 4.1 | 5 |
| 55 | 45 | 1.79 | 76.0 | 90 | 114 | 4.2 | 3.9 | 7 |
| 50 | 50 | 2.20 | 75.9 | 89 | 115 | 4.1 | 3.7 | 9 |
| 40 | 60 | 2.51 | 75.7 | 89 | 117 | 4.0 | 3.5 | 12 |
| 30 | 70 | 2.26 | 75.7 | 88 | 118 | 3.9 | 3.5 | 12 |

For the evaluation of the energy performance in a refrigeration process at low temperature, a compression system equipped with an evaporator, condenser and internal exchanger, a screw compressor and a depressurizer is considered.

The system functions with 15° C. of overheating. The evaporation temperature is −30° C. and the condensation temperature is 40° C.

The results obtained are collated in Table 3 below.

TABLE 3 refrigeration at low temperature, energy performance

| % | | T evaporator inlet (° C.) | T compressor outlet (° C.) | T condenser outlet (° C.) | T depressurizer inlet (° C.) | P evaporator (bar) | P condenser (bar) | Degree of compression (p/p) | Glide (evaporator) | Compressor yield | % CAP | % COP |
|---|---|---|---|---|---|---|---|---|---|---|---|---|
| R404A | | −30 | 83 | 40 | 33 | 2.0 | 18.1 | 9.0 | 0.47 | 68.4 | 100 | 100 |
| HFO-1243zf | $NH_3$ | | | | | | | | | | | |
| 85 | 15 | −33 | 129 | 34 | 28 | 1.4 | 15.2 | 11.0 | 2.75 | 65.3 | 96 | 114 |
| 80 | 20 | −31 | 141 | 37 | 31 | 1.5 | 16.7 | 11.0 | 1.16 | 65.3 | 107 | 113 |
| 75 | 25 | −30 | 153 | 39 | 32 | 1.6 | 17.8 | 11.1 | 0.11 | 65.2 | 114 | 113 |

TABLE 3-continued refrigeration at low temperature, energy performance

| % | | T evaporator inlet (° C.) | T compressor outlet (° C.) | T condenser outlet (° C.) | T depres-surizer inlet (° C.) | P evaporator (bar) | P condenser (bar) | Degree of compression (p/p) | Glide (evaporator) | Compressor yield | % CAP | % COP |
|---|---|---|---|---|---|---|---|---|---|---|---|---|
| 70 | 30 | −30 | 168 | 40 | 34 | 1.6 | 18.3 | 11.6 | 0.31 | 64.4 | 115 | 110 |
| 65 | 35 | −31 | 184 | 40 | 34 | 1.5 | 18.5 | 12.1 | 1.11 | 63.4 | 113 | 107 |

The invention claimed is:

1. A composition 3,3,3-trifluoropropene and ammonia.

2. The composition as claimed in claim 1, in which 3,3,3-trifluoropropene and ammonia represent at least 95% of the composition.

3. The composition as claimed in claim 1, comprising:

from 10% to 70% of ammonia and from 30% to 90% of 3,3,3-trifluoropropene.

4. A heat-transfer fluid comprising the composition as claimed in claim 1.

5. The composition as claimed in claim 4, in which the Composition is quasi-azeotropic.

6. A heat-transfer composition, comprising the composition as claimed in claim 1 and also one or more additives chosen from lubricants, stabilizers, surfactants, tracers, fluorescers, odorant agents and solubilizers, and mixtures thereof.

7. A heat-transfer installation comprising a vapor compression circuit containing a composition as claimed in claim 1 as heat-transfer fluid.

8. The installation as claimed in claim 7, chosen from mobile or stationary heat-pump heating, air-conditioning, refrigeration, freezing and Rankine-cycle installations.

9. A process for heating or cooling a fluid or a body by means of a vapor compression circuit containing a heat-transfer fluid, said process successively comprising evaporation of the heat-transfer fluid, compression of the heat-transfer fluid, condensation of the heat fluid and depressurization of the heat-transfer fluid, in which the heat-transfer fluid is a composition as claimed in claim 1.

10. The process as claimed in claim 9, which is a process for cooling a fluid or a body, in which the temperature of the cooled fluid or body is from −15° C. to 15° C.; or which is a process for heating a fluid or a body, in which the temperature of the heated fluid or body is from 30° C. to 90° C.

11. The process as claimed in claim 9, which is a process for cooling a fluid or a body, in which the temperature of the cooled fluid or body is from −40° C. to −10° C.

12. The process as claimed in claim 9, which is a process for heating a fluid or a body, in which the temperature of the heated fluid or body is greater than 90° C.

13. A process for reducing the environmental impact of a heat-transfer installation comprising a vapor compression circuit containing an initial heat-transfer fluid, said process comprising a step of replacing the initial heat-transfer fluid in the vapor compression circuit with a final heat-transfer fluid, the final heat-transfer fluid having a GWP less than the initial heat-transfer fluid, in which the final heat-transfer fluid is a composition as claimed in claim 1.

14. A solvent comprising the composition as claimed in claim 1.

15. An expander comprising the composition as claimed in claim 1.

16. A propellant comprising the composition as claimed in claim 1.

17. A cleaning agent comprising the composition as claimed in claim 1.

18. The composition as claimed in claim 1, in which 3,3,3-trifluoropropene and ammonia represent at least 99.9% of the composition.

19. The composition as claimed in claim 1, comprising from 25% to 35% of ammonia and from 65% to 75% of 3,3,3-trifluoropropene.

20. A composition consisting essentially of 3,3,3-trifluoropropene and ammonia.

21. The composition as claimed in claim 20, wherein:

10% to 70% of the composition is ammonia and 30% to 90% of the composition is 3,3,3-trifluoropropene.

* * * * *